US011563385B2

(12) United States Patent
Biris et al.

(10) Patent No.: US 11,563,385 B2
(45) Date of Patent: *Jan. 24, 2023

(54) DC CHOPPER FOR MMC CELL WITH INTEGRATED CHOPPER RESISTOR

(71) Applicant: VESTAS WIND SYSTEMS A/S, Aarhus (DK)

(72) Inventors: Ciprian Biris, Hinnerup (DK); Cem Özgür Gerçek, Risskov (DK); Lars Helle, Suldrup (DK); Duy Duc Doan, Tilst (DK); Tune Pedersen, Hinnerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,731

(22) Filed: Dec. 27, 2021

(65) Prior Publication Data
US 2022/0123667 A1    Apr. 21, 2022

Related U.S. Application Data

(63) Continuation of application No. 16/992,051, filed on Aug. 12, 2020, now Pat. No. 11,211,878.

(30) Foreign Application Priority Data

Aug. 13, 2019    (DK) ................ 2019 70515

(51) Int. Cl.
*H02M 7/483*    (2007.01)
*H02M 1/32*    (2007.01)
(Continued)

(52) U.S. Cl.
CPC .......... *H02M 7/4835* (2021.05); *F03D 7/042* (2013.01); *H02J 3/381* (2013.01); *H02M 1/32* (2013.01);
(Continued)

(58) Field of Classification Search
CPC ...... H02M 1/32; H02M 7/483; H02M 7/4835; H02M 5/458; H02J 3/381; H02J 2300/28; F03D 7/042
See application file for complete search history.

(56) References Cited

U.S. PATENT DOCUMENTS 8,610,384 B2 * 12/2013 Dommaschk ............. H02P 3/22
                                                    318/370
9,954,358 B2 *  4/2018 Okaeme ............... H02M 7/4835
(Continued)

FOREIGN PATENT DOCUMENTS

CN    102355154 A    2/2012
CN    102957378 A    3/2013
(Continued)

OTHER PUBLICATIONS

European Patent Office, Communication Pursuant to Article 94(3) EPC for Application 20 190 429.9-1202 dated Sep. 2, 2022.
(Continued)

*Primary Examiner* — Yusef A Ahmed
(74) *Attorney, Agent, or Firm* — Patterson + Sheridan, LLP

(57) ABSTRACT

This disclosure proposes a topology that integrates a DC chopper into the Modular Multilevel Converter (MMC) cells of a power converter. The integrated DC chopper may include chopper resistors that may also be advantageously integrated into a heat sink for a power module including at least the power transistors of the MMC cell. Embodiments herein also describe a method for using an MMC cell's IGBTs and chopper resistors for providing a safe discharge of both cell capacitors and DC-link capacitors in different operating conditions.

7 Claims, 12 Drawing Sheets

(51) Int. Cl.
  *F03D 7/04* (2006.01)
  *H02J 3/38* (2006.01)
  *H02M 5/458* (2006.01)

(52) U.S. Cl.
  CPC ......... *H02M 5/458* (2013.01); *H02J 2300/28* (2020.01); *H02M 7/483* (2013.01)

(56) References Cited

U.S. PATENT DOCUMENTS

| | | | | |
|---|---|---|---|---|
| 10,411,587 | B2* | 9/2019 | Qi | H02M 7/219 |
| 2011/0019449 | A1* | 1/2011 | Katoh | H02M 7/483 363/124 |
| 2011/0163702 | A1* | 7/2011 | Dommaschk | H02P 3/22 318/376 |
| 2012/0026767 | A1* | 2/2012 | Inoue | H02M 7/217 363/78 |
| 2015/0171726 | A1* | 6/2015 | Singh Riar | H02M 7/4835 363/65 |
| 2015/0171769 | A1* | 6/2015 | Geyer | H02H 7/1227 363/71 |
| 2016/0313387 | A1* | 10/2016 | Schweizer | H02M 7/4835 |
| 2016/0373022 | A1* | 12/2016 | Outram | H02M 1/36 |
| 2017/0302189 | A1* | 10/2017 | Jakob | H02M 1/088 |
| 2018/0034399 | A1* | 2/2018 | Bando | H02P 25/18 |
| 2018/0183231 | A1* | 6/2018 | Xie | H02H 7/1203 |
| 2018/0226882 | A1* | 8/2018 | Jonsson | H02M 7/4835 |
| 2019/0068076 | A1* | 2/2019 | Uda | H02M 1/32 |
| 2019/0157968 | A1* | 5/2019 | Tsuchiya | H02M 7/12 |
| 2019/0173392 | A1* | 6/2019 | Li | H02M 7/483 |
| 2019/0173393 | A1* | 6/2019 | Chivite Zabalza | H02M 1/34 |
| 2019/0207533 | A1* | 7/2019 | Kikuchi | H02M 7/49 |
| 2019/0338753 | A1* | 11/2019 | Biris | H02M 7/4835 |
| 2020/0007028 | A1* | 1/2020 | Hong | H02M 7/4835 |
| 2020/0287378 | A1* | 9/2020 | Spooner | H02H 3/025 |
| 2020/0362823 | A1* | 11/2020 | Helle | H02M 5/458 |
| 2021/0036600 | A1* | 2/2021 | Xie | H02M 7/483 |
| 2021/0118611 | A1* | 4/2021 | Bando | H02M 7/4835 |
| 2021/0135662 | A1* | 5/2021 | Davidson | H02M 7/4835 |

FOREIGN PATENT DOCUMENTS

| | | |
|---|---|---|
| DE | 102008045247 A1 | 3/2010 |
| EP | 3113311 A1 | 1/2017 |
| WO | 2013060354 A1 | 5/2013 |
| WO | 2015128377 A1 | 9/2015 |
| WO | 2017140464 A1 | 8/2017 |
| WO | 2018095552 A1 | 5/2018 |

OTHER PUBLICATIONS

Extended European Search Report for Application No. 20190429.9-1201 dated Jan. 15, 2021.

V. Hussennether et al., "Projects Borwin2 and HelWin1-Large Scale Multilevel Voltage-Sourced Converter Technology for Bundling of Offshore Windpower," Mar. 9, 2012, DXP055489887.

Danish Patent and Trademark Office, 1st Technical Examination of Patent Application, PA 2019 70515, dated Feb. 10, 2020.

* cited by examiner

DC CHOPPER FOR MMC CELL WITH INTEGRATED CHOPPER RESISTOR

CROSS-REFERENCE TO RELATED APPLICATIONS

This application is a continuation of co-pending U.S. patent application Ser. No. 16/992,051 filed Aug. 12, 2020, which claims priority to Danish Patent Application PA 2019 70515 filed on Aug. 13, 2019. Each of these applications are hereby incorporated by reference in their entirety.

FIELD OF THE INVENTION

Embodiments presented in this disclosure generally relate to wind turbine power generators and transmission systems including control of those generators and systems and wind turbine generator power conversion.

BACKGROUND

Different power converter topologies exist in medium voltage (MV) and high voltage (HV) converters in applications such as wind power generation conversion. Wind turbines normally implement 2-level or 3-level converters where the level designations correspond to a number of voltage levels used to represent an alternating current (AC). In these deployments, it is often advantageous to connect a rail-to-rail direct current (DC) chopper on a DC-link. However, it may be disadvantageous to connect a DC chopper on a DC-link for power converters using Modular Multilevel Converter (MMC) type topology.

As an example, in one power converter topology, to produce requested power it may be beneficial to connect to AC networks operating at different frequencies. In such power transmission networks, converters may be used at each interface between AC and DC power to perform the conversion. For example, AC power from a wind turbine can be converted by a machine side converter to DC power which is transmitted via a DC-link to a line (or grid) side converter which converts the power back to an AC voltage or frequency compatible with the line (or grid) voltage. These systems may use a chopper circuit on the DC-link, sometimes referred to as a "braking chopper," to dissipate excess power supplied from the generator into a braking resistor, for example, during grid fault conditions such as the presence of excess voltage at a DC-link capacitor. The power dissipated by the braking resistor is determined by a chopper switch. Because a potentially large amount of power may need to be dissipated, the braking resistor may be quite large and since the DC-link may typically have a voltage of several kilo-volts. Additionally, the higher voltages may require the use of a specific type of insulated-gate bipolar transistor (IGBT) such as press-pack.

In wind turbine generators, MMC topologies have begun to emerge due to attractive properties such as scalability. The MMC has the advantage of having a simple design; however existing MMCs have issues associated with circulating currents, large current rating requirement of the devices, large capacitor voltage ripples, and balancing capacitor voltages. Further, MMCs have the challenge of controlling fast switching elements that carry large currents. These MMCs are thus subjected to a high level of power losses in the form of heat dissipation and, in turn, hold a significant impact on the device power requirements and dimensions. Current heat removal systems that include natural convection, forced convection, and liquid cooling are used, but can be costly in terms of money, time, and space resources. The required power ratings of the semiconductors, capacitors, and resistors used in medium/high DC voltage (MVDC/HVDC) converters also increases the cost. Also, the high switching losses associated with existing MMC power devices results in increasing the energy dissipation needs of the system especially as the number of switching state levels increases exponentially with the increase in the number of converter voltage levels.

Further, during service and maintenance of the MMCs, it is important that the energy storing elements are safely de-energized before human interaction. In the case of an MV converter based on MMC topology, for example, numerous capacitors, both in converter cells and in any connected DC-link should be de-energized. This has been done passively by using bleed resistors connected across all capacitors. The passive discharge is simple but requires additional resistive components and is associated with a constant power loss. Thus a safer, space conscious, and more efficient means of removing energy and heat from the system is needed.

SUMMARY

One embodiment described herein is an MMC that includes a plurality of MMC cells, each MMC cell including at least two main transistors connected in series between a first voltage rail and a second voltage rail and a DC chopper connected between the first rail and the second rail. Another embodiment described herein is a method for de-energizing a modular MMC power converter. The method includes receiving an instruction to de-energize at least one phase leg of the MMC power converter comprising a plurality of MMC cells, configuring power transistors in the plurality of MMC cells of the at least one phase leg to guide current through a plurality of DC choppers integrated into the plurality of MMC cells, and determining a period of time to de-energize the MMC power converter using resistors in the plurality of DC choppers.

Another embodiment described herein is a modular power module that includes at least two main transistors connected in series between a first voltage rail and a second voltage rail and a DC chopper connected between the first rail and the second rail, the DC chopper comprising a controllable chopper transistor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments herein describe integrating DC choppers into cells of a MMC. The basic structure of the MMC includes arm inductors in series with a plurality of MMC cells (also referred to as sub-modules). Each cell may include one or more separate power modules which may hold the main switching power devices such as IGBTs, cell capacitors, thyristors, diodes, and the like. Rather than coupling a DC chopper between the rails of the DC link (which may require using special IGBTs such as press-pack), the embodiments herein integrate DC choppers into the MMC cells. That is, in one example, each cell (or each power module) includes its own DC chopper. The DC chopper may be connected between two voltage rails in each cell in parallel with a pair of series-coupled transistors. In one embodiment, the DC chopper includes at least one controllable chopper transistor coupled in series to a diode and a bleed resistor.

By integrating a respective DC chopper into a plurality of MMC cells, the modularity of the MMC topology is maintained and the converter can be protected against overvoltages at either converter level, arm level, or individual cell level. Furthermore, this solution also works well with cell balancing algorithms often used with MMC type converters, and may eliminate the need for large chopper dump resistors and cell bleed resistors. The proposed solution also provides for improved scaling in power and chopping ability as the number of voltage levels varies with the converter. The integrated DC choppers further provide paths for discharging of DC-link capacitors as well as MMC cell capacitors that would not be available using a rail-to-rail chopper on the DC-link.

Furthermore, integrating the chopper's resistor into the heat sink for cell components provides improved heat distribution that may be scaled with the heat removal requirements of the system.

EXAMPLE EMBODIMENTS

Figure 1:
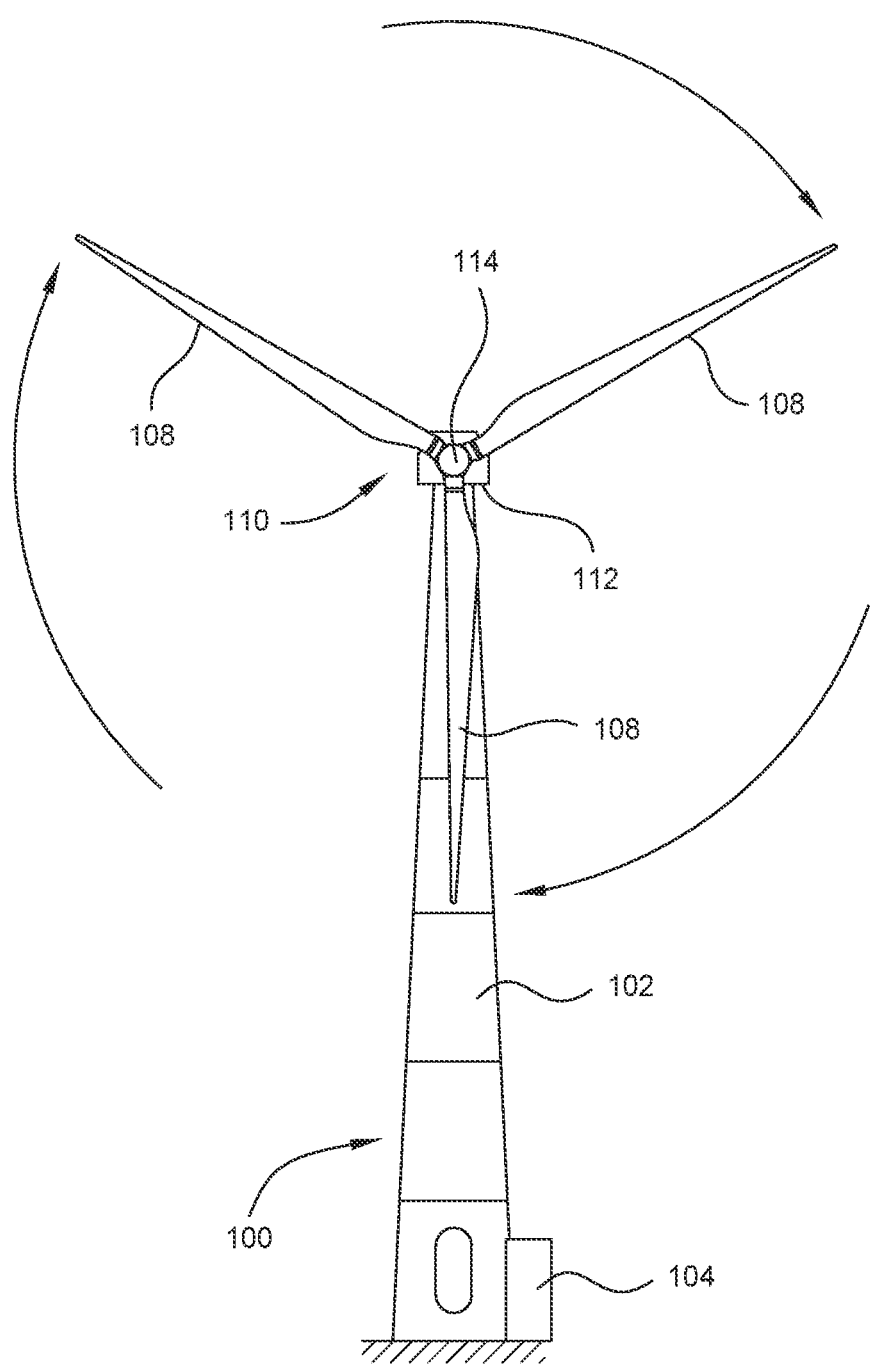
FIG. 1 illustrates a diagrammatic view of a wind turbine, according to one or more embodiments described in this present disclosure.

FIG. 1 illustrates a diagrammatic view of a horizontal-axis wind turbine generator 100. The wind turbine generator 100 typically comprises a tower 102 and a nacelle 112 located at the top of the tower 102 in an up-tower assembly 110. A wind turbine rotor 114 may be connected with the nacelle 112 through a low speed shaft extending out of the nacelle 112 to drive a generator. The wind turbine rotor 114 comprises three rotor blades 108 (or airfoils) mounted on a common hub which rotate in a rotor plane, but may comprise any suitable number of blades, such as one or more blades. The blades 108 typically each have an aerodynamic shape with a leading edge for facing into the wind, a trailing edge at the opposite end of a chord for the blades 108 attached in a suitable manner.

For some embodiments, power conversion and power generation circuits may be located in the up-tower assembly 110 or in a down-tower location such as a down-tower cabinet 104. Cabinet 104 may also be located inside a base of the tower 102 for ready access and protection from weather events. These electronics may also be located off site or in a central location to a number of wind turbine generators, or spread out in any combination of these places. One advantage of having the electronics, especially power conversion circuits in a down-tower location (e.g. cabinet 104) is that maintenance personnel may have easy access to the circuits for maintenance, repair, and inspection. Although shown outside the tower 102, this is not a requirement. For example, in some embodiments, cabinet 104 is located inside the tower 102 or at another location.

Figure 2A:
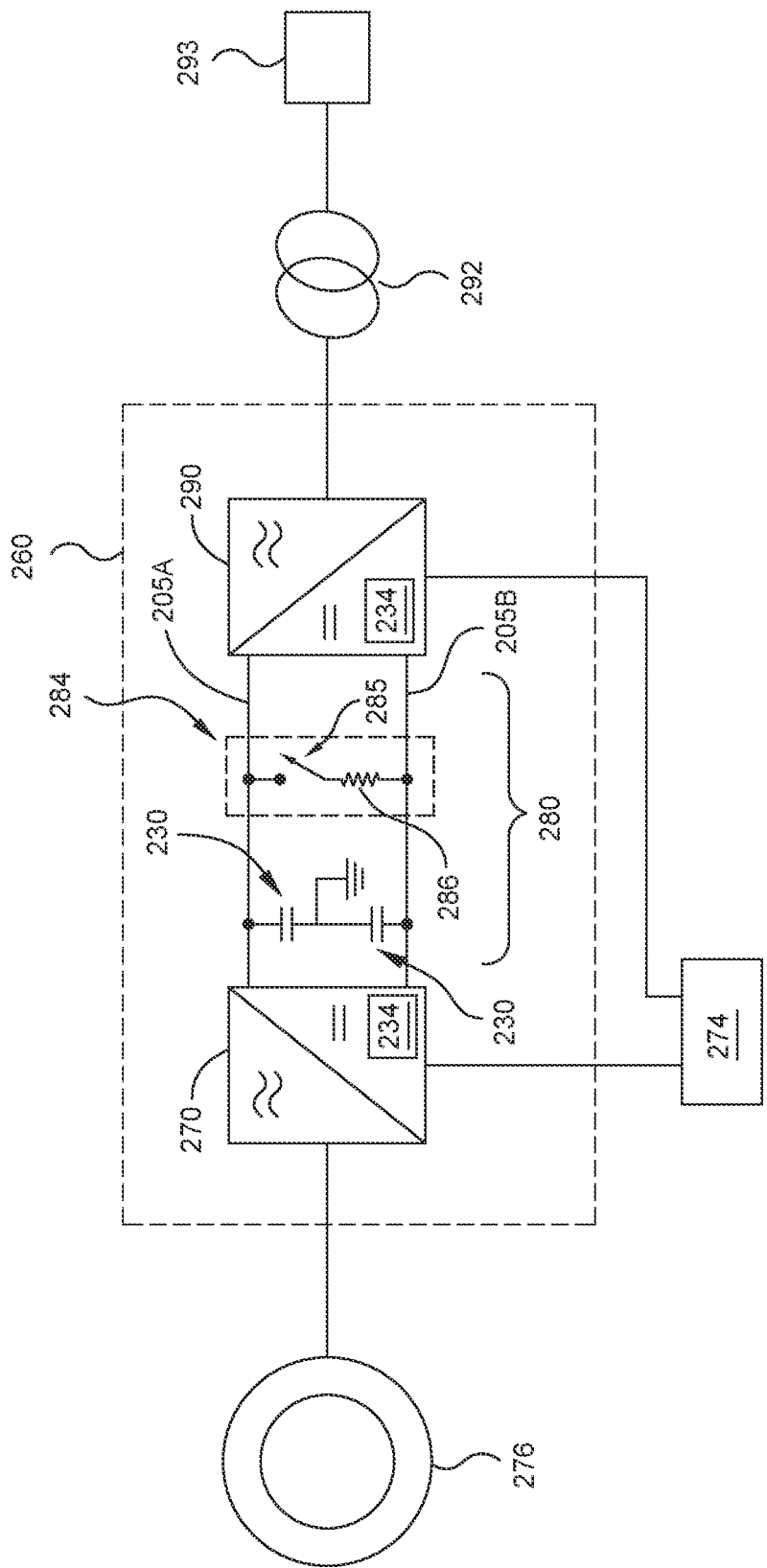
FIG. 2A illustrates a simplified schematic example of a converter configuration according to one or more embodiments described in this present disclosure.

FIG. 2A illustrates a simplified schematic of a turbine generator power conversion configuration. The power conversion configuration may be used in generator topologies including a Doubly Fed Induction Generator, a Permanent Magnet Generator, a hybrid generator, or another suitable generator configuration. In this configuration, an alternating current (AC) from a generator 276 is converted via a full-scale converter 260 to another AC current suitable to be supplied to a power grid 293 which may need to receive power, for example, at a frequency different than generator 276 provides. A power grid transformer 292 may be used to prepare a voltage output of the converter 260 to an appropriate grid voltage. In an embodiment, the generator 276 supplies and the grid 293 receives three-phase AC power. But this is not a particular requirement as different embodiments of the converter 260 may supply or receive any number of AC phases.

The converter 260 operates by converting the AC power supplied by the generator 276 to DC via a machine side converter (MSC) 270 (sometimes referred to as "rotor side" converter (RSC)) which acts as a rectifier, and back to AC via a line side converter (LSC) 290 (also sometimes referred to as "grid side" converter (GSC)) which acts as an inverter. The MSC 270 and the LSC 290 are coupled by means of a DC-link 280. Control of the side converters 270, 290 is provided by one or more controller circuits 274 that may be, for example, simple circuits operated by switches, or may be more complex circuits, for example, a controller programmed with software. The controller circuits 274 may, in some cases, be powered by the side converters 270, 290. Although shown separately from the converter 260, the controller circuits 274 may be organized or distributed differently. For example, the controller circuits 274 may be integrated into the converter 260 and each side converter 270, 290 may have its own control circuits 274.

The DC Link 280 has at least one DC-link capacitor 230 to store and maintain the DC voltage between the MSC 270 and the LSC 290. In the embodiment shown in FIG. 2A, two DC-link capacitors 230 are connected to a common (neutral) voltage node and the non-common terminals connected to opposite voltage rails of the DC-link.

In some arrangements, the DC-link 280 may include a DC-link chopper 284 acting as a braking circuit. The DC-link chopper 284 may be a resistor-switch combination connected in parallel with the DC-link capacitor 230. In particular, the DC-link chopper 284 may include a braking resistor 286 and a switch 285 that may be configured to be manually controlled or controlled via controller circuits 274.

In this arrangement, the excess power supplied from the generator 276 can be dissipated by the braking resistor 286 during, for example, grid fault conditions. In some embodiments, a relay or other suitable circuit (e.g., controller circuit 274) senses the voltage at the DC-link capacitor 230 and sends a signal to control the switch 285 whenever the voltage at the DC-link 280 rises above a threshold value, thus preventing the DC-link voltage from rising excessively and potentially damaging the wind turbine 100 or any of its electronic circuitry. The power dissipated by the braking resistor 286 is controlled from the duty cycle of the switch 285.

Rather than relying on a chopper connected to the DC-link, FIG. 2A illustrates that the side converters 270, 290 may include integrated DC choppers 234. The components and functions of the integrated DC choppers 234 are discussed in more detail below. In an embodiment, the side converters 270, 290 are MMCs and the integrated DC choppers 234 are integrated into cells of the MMCs. While FIG. 2A illustrates a converter system with both integrated DC choppers 234 and a DC-link chopper 284 connected to the DC-link 280, in another embodiment, the converter system may include only the integrated DC choppers 234 (i.e., the DC-link chopper 284 can be omitted).

Figure 2B:
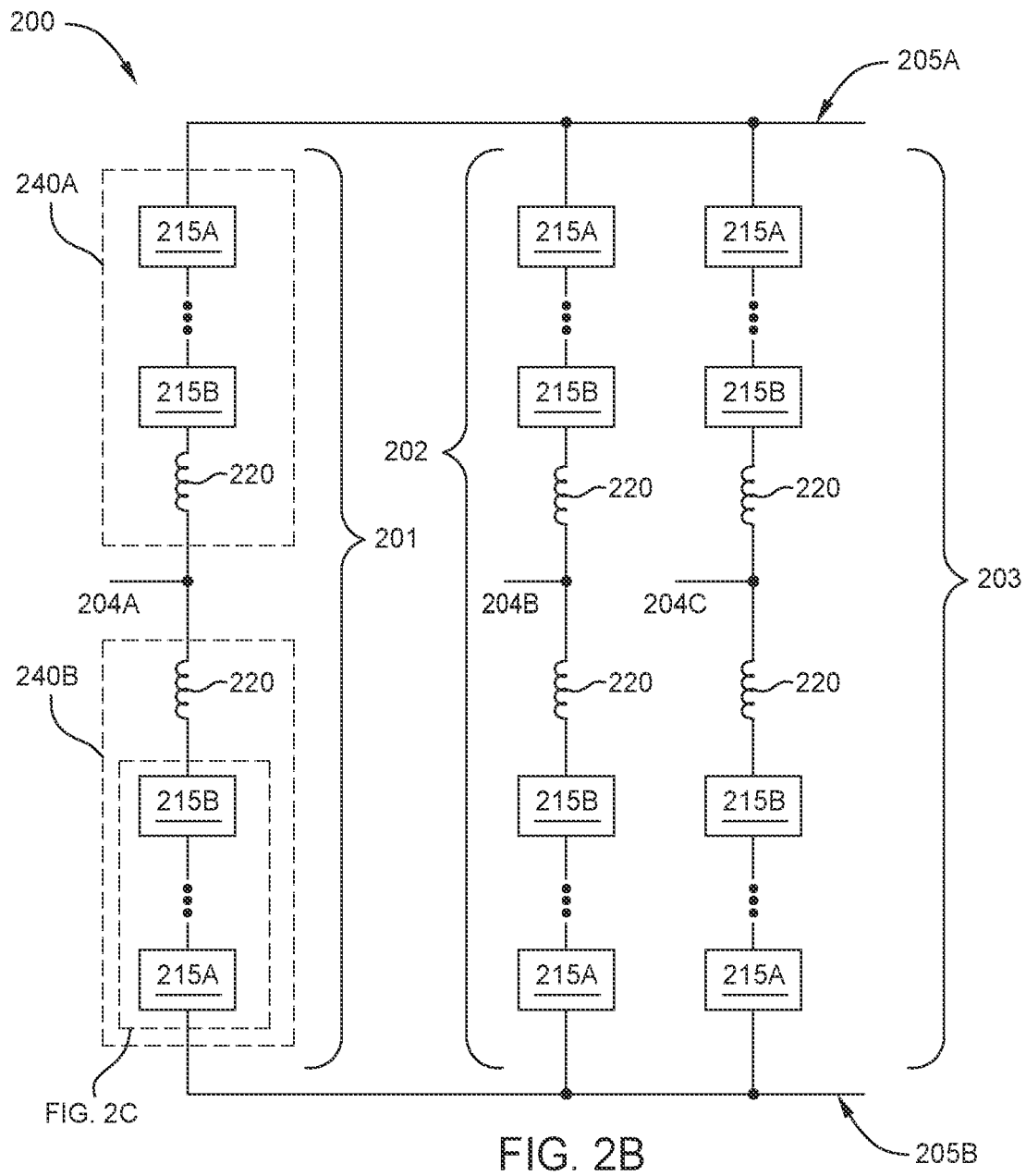
FIG. 2B illustrates a three-phase MMC, according to one or more embodiments described in this present disclosure.

FIG. 2B shows the basic schematic structure of the three-phase MMC 200. According to one embodiment herein, MMC 200 may be suitable for use both as an LSC 290 inverter and as an MSC 270 converter or rectifier. As shown in FIG. 2B, the MMC 200 has three phase legs 201, 202, and 203, each phase leg having a corresponding phase leg node 204A, 204B, and 204C as an input/output for AC power. Each phase leg may have two arms 240A, 240B, i.e., an upper arm and a lower arm (indicated by dashed boxes). For simplicity of illustration, only the arms for phase leg 201 are so indicated. As shown, phase leg 201 has an upper arm 240A that includes an arm inductor 220. In some embodiments, lower arm 240B is similar in structure to upper arm 240A. In an embodiment, arm 240A is a mirror of arm 240B about the phase leg voltage node 204A. At the end of each arm of the phase leg is a voltage rail 205. For example, as shown in FIG. 2B, the end of arm 240A is connected to voltage rail 205A. Similarly, the end of arm 240B is connected to voltage rail 205B. As shown in FIG. 2A, voltage rails 205 form the voltage rails for the DC-link 280 and may serve as the DC input/output of the MSC/LSC. It should be understood that although MMC 200 is shown having three-phase legs, that the converter is not so limited and that any appropriate number of phase legs may be used in accordance with embodiments of the invention.

Each arm 240 comprises at least two MMC cells 215 connected in series with the arm inductor 220 via a cell input node and output node. For example, arm 240A of phase leg 201 comprises arm inductor 220 connected in series with an input node of MMC cell 215B. Although each MMC cell uses one or more control signals to control each cell in operation of the MMC, for simplicity of illustration, these control signals are not shown.

The MMC cells are comprised in an individual arm (sometimes referred to as an MMC "valve"). For simplicity of illustration, arm 240B and two MMC cells 215 of phase leg 201 is discussed with respect to FIG. 2B. However, it should be appreciated that this discussion applies to all six arms shown in FIG. 2B, and that in different embodiments, the arms 240 may comprise any number of MMC cells. In one embodiment, each arm comprises two MMC cells 215A, 215B connected in series where the lower arm has a similar structure as the upper arm.

Figure 2C:
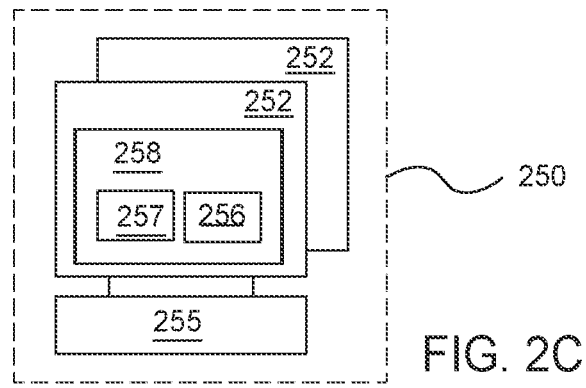
FIG. 2C illustrates an organizational block diagram of MMC cell circuitry as organized into power modules having integrated DC choppers according to one or more embodiments described in this present disclosure.

FIG. 2C shows a block diagram of MMC cell circuitry 250 illustrating a physical arrangement of MMC cell 215 elements according to embodiments disclosed herein. In an embodiment, the MMC cell circuitry 250 comprises one or more power modules 252. Conversely, in an embodiment, power module 252 may comprise one or more MMC cells 215. Advantageously, each power module 252 may comprise main transistors and one or more integrated DC chopper circuits 258 that are examples of the integrated DC choppers 234 (FIG. 2A). The integrated DC chopper circuit 258 may comprise a controllable switch 256 (e.g., a controllable chopper transistor) and an integrated chopper resistor 257. In some embodiments, the integrated chopper resistor 257 is integrated into a heat sink to distribute heat energy from the power module 252. That is, the chopper resistor 257 can represent a heat sink and a chopper resistor. The integrated chopper resistor 257 may be integrated into each MMC cell 215 or may be integrated into each power module 252 of the MMC 200, thus distributing energy dissipated in throughout the MMC 200.

Power module 252 may also comprise electrical input connections and electrical output connections that correspond to input and output nodes of the MMC cell 215. The electrical connections may serve to electrically connect the power module 252 to other converter circuitry. For example, the electrical connections may electrically connect one power module 252 to a second power module 252. This type of connection may also serve to connect MMC cells 215 within the MMC cell circuitry 250. The connections may be made directly or indirectly (e.g., via a connection bus or bar thus providing a fast and simple means to connect and disconnect the power modules 252).

As discussed further below, power module 252 comprises certain MMC cell power devices. Each power module 252 may be physically identical and therefore may advantageously be swapped or substituted for one another. As used in a modular system such as MMC 200, power modules 252 are modular system components that may be relatively easily replaced when faulty or requiring inspection or service. The power module 252 may have a heat interface (not shown) for thermally coupling the integrated chopper resistor 257 with a heat removing system (e.g., a fluid cooling, heat sink, fans, etc.). In some embodiments, each power module 252 is connected to an external circuitry block 255 which may alternatively include the integrated chopper resistor 257 and other MMC cell circuitry such as cell capacitors as is described in further detail below. In some embodiments, rather than disposing a heat sink in the power module 252, heat sinks for the power modules 252 may be disposed external to the power module 252 but are nonetheless thermally coupled to the circuitry in the power module 252. In some embodiments, the power module 252 may comprise cell capacitor connections that electrically connect the power module 252 to one or more cell capacitors in the external circuitry block 255.

Figure 3A:
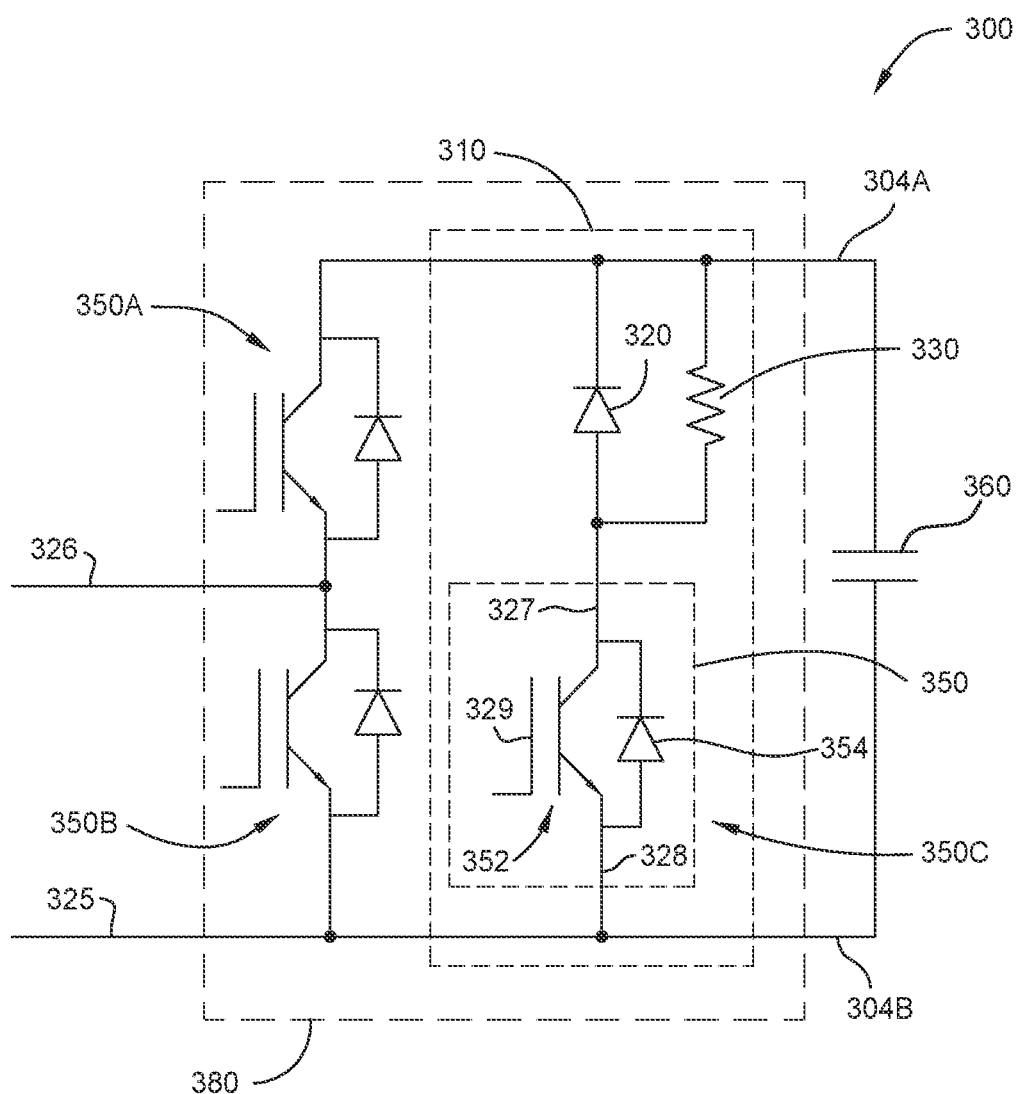
FIG. 3A illustrates a schematic of an MMC single cell with integrated chopper and dump resistor according to one or more embodiments described in this present disclosure.

FIG. 3A shows an electrical schematic for an MMC single cell 300 which is an example of the MMC cell 215 illustrated in FIG. 2B according to one or more embodiments described in this present disclosure. The MMC single cell 300 includes an input node 325 and an output node 326 corresponding to the input and output nodes of MMC cell 215. MMC single cell 300 includes three Diode-integrated Insulated Gate Bipolar Transistors (IGBTs) referred to herein as DIGBTs 350. In particular, DIGBT 350 comprises a power transistor IGBT 352 having a collector 327, emitter 328, and a controllable gate 329. Also included in DIGBT 350 is an anti-parallel diode 354 that is connected anti-parallel to the IGBT such that its anode is connected to the emitter of IGBT 352 and its cathode is connected to the collector of IGBT 352. The anti-parallel diode 354 may allow current to flow in one direction across the DIGBT 350 when its IGBT 352 is not conducting. It should be noted that this anti-parallel diode 354 of DIGBT 350 may also be formed in different ways, (e.g., by connecting two transistors in anti-parallel with each other).

The main DIGBTs 350A and 350B (e.g., main transistors) of MMC single cell 300 are arranged in a half-bridge configuration with the input node 325 of MMC single cell 300 connected to the emitter 328 of DIGBT 350B and the voltage rail 304B. The collector 327 of DIGBT 350B is connected to the output node 326 and also connected to the emitter 328 of DIGBT 350A. The collector 327 of DIGBT 350A is connected to voltage rail 304A. As mentioned earlier, the control signals that connect to the gates 329 of the DIGBTs 350 are not shown. The main DIGBTs 350A and 350B may be controlled to provide for both the modular and scalar conversion of power.

The MMC single cell 300 includes a DC chopper 310 between voltage rails 304A and 304B. As described herein, the DC chopper 310 is an example of the integrated DC chopper 234 (FIG. 2A). An MMC cell capacitor 360 that is used to. For example, store energy in the cell is also connected between voltage rails 304A and 304B in parallel with the DC chopper 310. In an embodiment, the DC chopper 310 includes a DIGBT 350C. The IGBT 352 of DIGBT 350C may be connected in series with a free-wheeling diode 320 such that the emitter 328 of the DIGBT 350C is connected to voltage rail 304B and the collector 327 of DIGBT 350C is connected to the anode of diode 320. The cathode of diode 320 is connected to voltage rail 304A. The DC chopper 310 also may include a dump resistor 330 that is connected in parallel with diode 320. Dump resistor 330 is an example of the integrated chopper resistor 257. The IGBT 352 of DIGBT 350C serves as the controllable switch 256 (i.e., a controllable chopper transistor) that controls the voltage across the integrated chopper 310. Specifically, the voltage across the DC chopper 310 may be controlled by varying the duty cycle of the controllable switch 256 thus varying the current that flows through the dump resistor 330. In some embodiments, the duty cycle is controlled by controller circuitry 274 using pulse width modulation.

As discussed with reference to FIG. 2C, an interchangeable module (e.g., power module 380) is an example of power module 252 (illustrated in FIG. 2C) and may include certain circuitry from the MMC single cell 300. In one embodiment, the power module 380 includes the three DIGBTs 350A-350C as well as the diode 320 and their electrical inter-connections. The power module 380 may be physically integrated such that the power module 380 may be relatively easily installed and removed from the wind turbine generator 100 without separate installation or removal of any individual components (e.g., IGBTs, DIGBTs, etc.). Further, the power module 380 may include the dump resistor 330 which may be incorporated into a heat sink for power module 380. Power module 380's circuitry may be physically integrated into one module body.

In an embodiment, MMC cell capacitor 360 is connected, but not physically integrated with the power module 380. In yet another embodiment, all of the circuitry in MMC single cell 300 is integrated into power module 380 including the MMC cell capacitor 360. Note that the dump resistor 330 should be of sufficient size and thermal mass as to absorb the energy produced in the MMC single cell 300 including energy stored in the MMC cell capacitor 360. The integrated dump resistor 330 may be physically partitioned within the power module to provide proportional heat dissipation according to the expected dissipation of each power device. In some embodiments, the dump resistor 330 comprises a plurality of series and/or parallel connected resistors such that DIGBTs 350A and 350B in the power module 252 include a separate heat sink with the equivalent electrical connection as a single dump resistor 330. One embodiment of the present disclosure eliminates or reduces the need for a DC-link chopper 284 at the DC-link 280. As shown in FIG. 3A, an embodiment of the present disclosure distributes DC choppers throughout the MMC cells of an MMC.

Figure 3B:
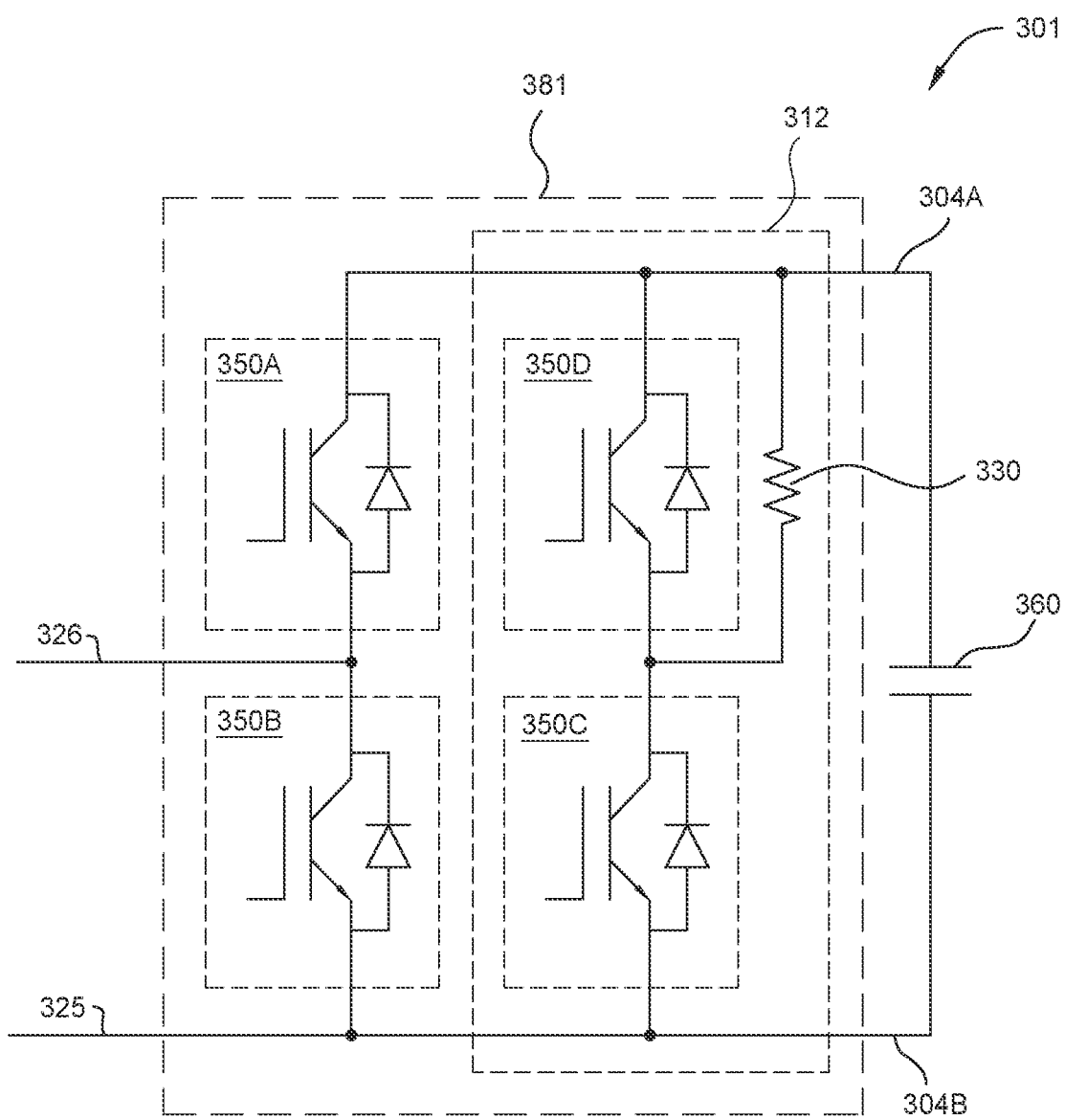
FIG. 3B illustrates a schematic of an MMC single cell with integrated chopper and dump resistor according to one or more embodiments described in this present disclosure.

MMC single cell 301 as shown in FIG. 3B is largely the same as MMC single cell 300 except that the DIGBT 350D in its integrated DC chopper 234 (i.e., DC chopper 312) replaces the discrete free-wheeling diode 320. In one embodiment, the gate control input for DIGBT 350D is un-asserted or tied off such that the DIGBT 350D is always off and its anti-parallel diode 354 takes the place of diode 320. For MMC single cell 301, one embodiment of power module 252 (FIG. 2C) is an associated power module 381 that comprises all four DIGBTs 350A-350D and the integrated dump resistor 330. This arrangement further modularizes the power module in that the module may be symmetric with respect to the placement of the DIGBTs within the power module 381. Additionally, the bill of materials is made simpler by only having one type power device in the module. Heat sink design may also be simplified or improved due to the possible physical symmetry of the module. Like in power module 380, the dump resistor 330 may be physically partitioned within the power module to provide proportional heat dissipation according to the expected dissipation of each power device.

Figure 3C:
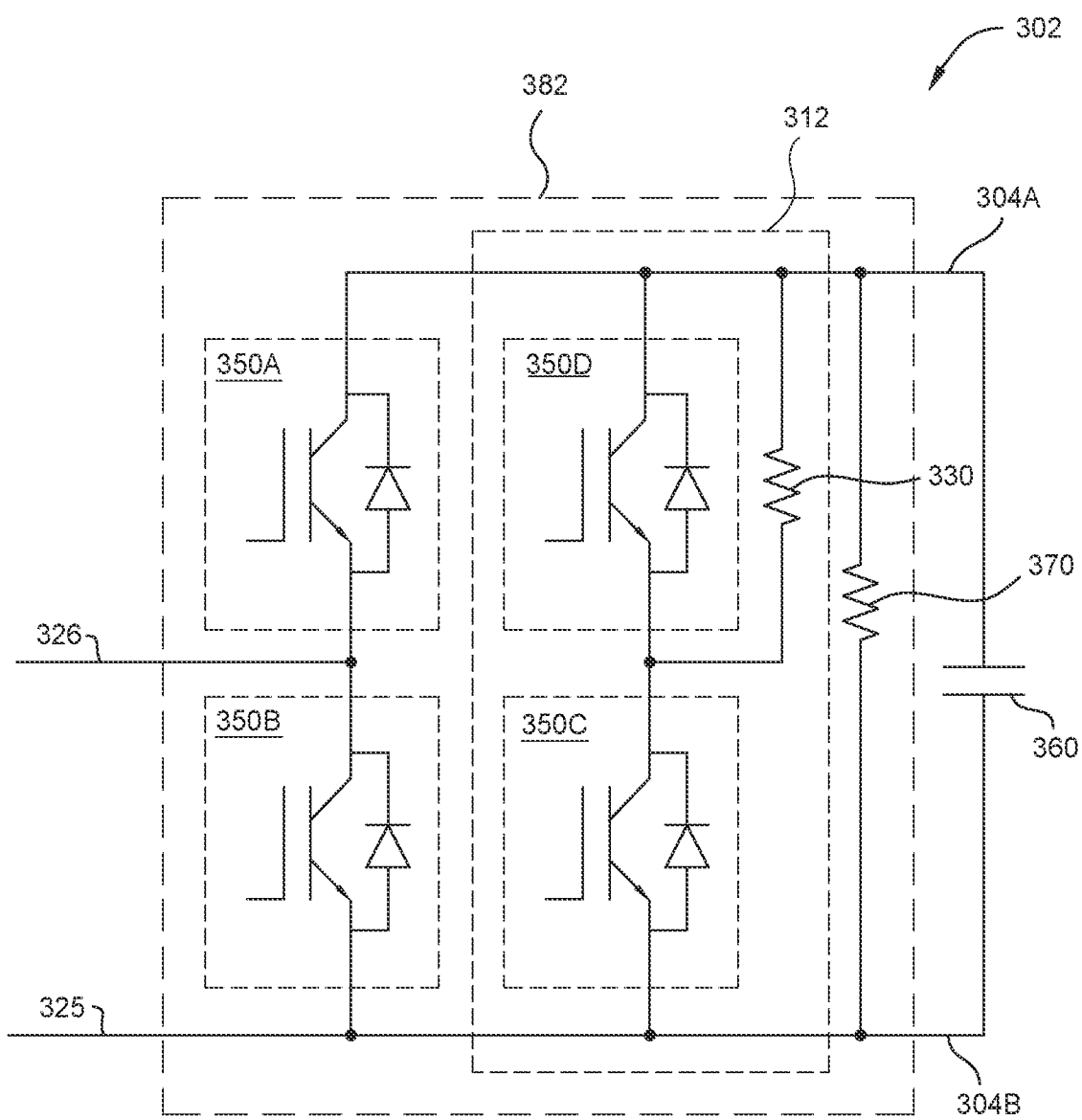
FIG. 3C illustrates a schematic of an MMC single cell with integrated chopper and dump resistor with a bleed resistor according to one or more embodiments described in this present disclosure.

In FIG. 3C, MMC single cell 302 and power module 382 share the same features and components as MMC single cell 301 and power module 382 except that an optional bleed resistor 370 is included in parallel with MMC cell capacitor 360 and the components in the DC chopper 312. In one embodiment, bleed resistor 370 is additionally or alternatively incorporated into a heat sink for power module 382. For example, in some embodiments, the addition of the bleed resistor 370 may be desired to complement the DC chopper 312. For example, in some cases, a low voltage operation of the DC chopper 312 may not be feasible or desired; in this case, the bleed resistor 370 may continue to discharge the MMC cell capacitor 360 when the DC chopper 312 is not active.

Figure 4A:
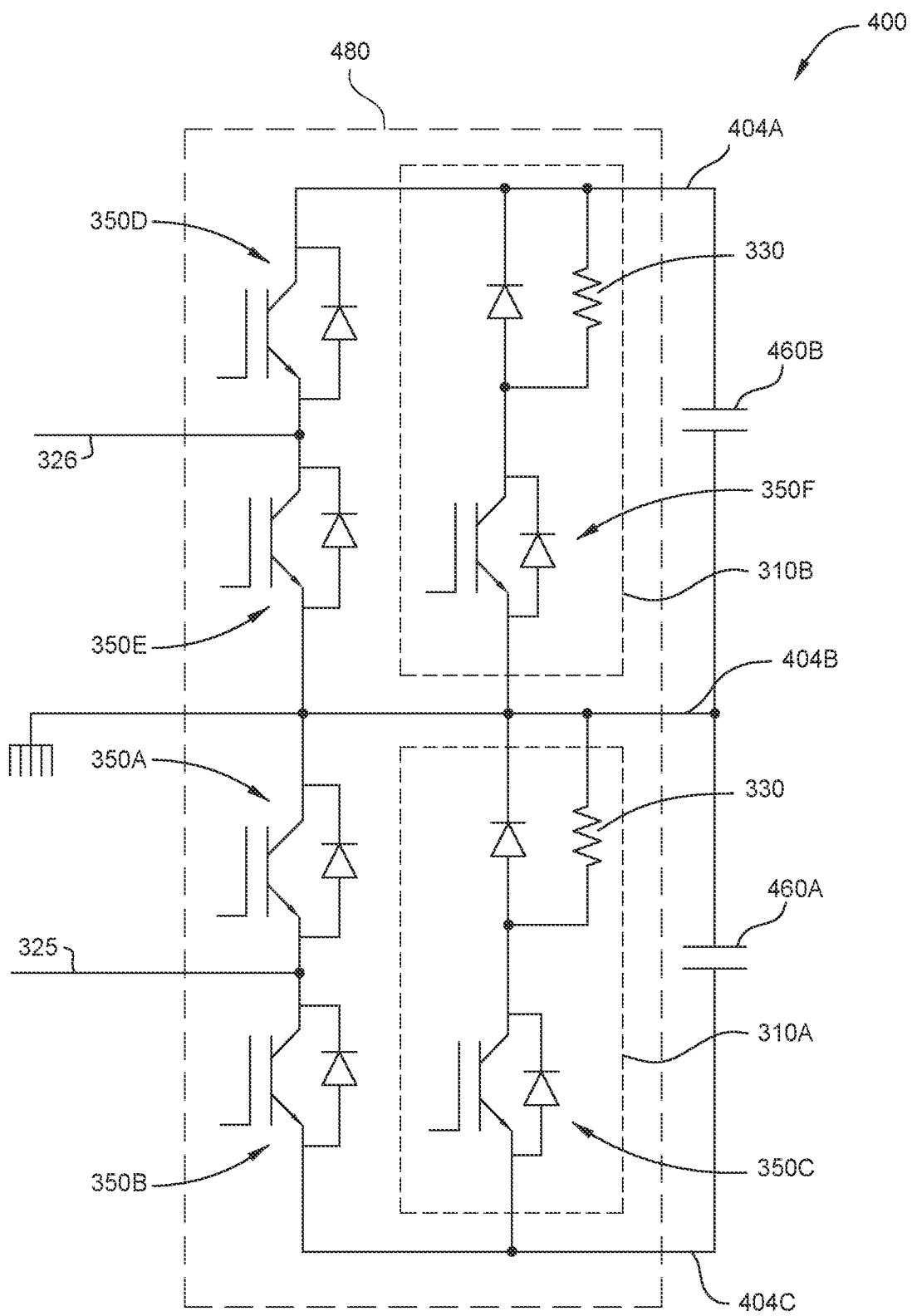
FIG. 4A illustrates a schematic of an MMC dual cell with integrated chopper and dump resistor according to one or more embodiments described in this present disclosure.

FIG. 4A shows an electrical schematic for an MMC dual cell 400 which may also be used as the MMC cell 215 (FIG. 2B) according to one or more embodiments described in this present disclosure. The MMC dual cell 400 includes an input node 325 and an output node 326, four DIGBTs 350, two DC choppers 310A, 310B, and two MMC cell capacitors 460A, 460B. The MMC dual cell 400's main DIGBTs 350A, 350B, 350D, and 350E are arranged in a full-bridge configuration with the input of MMC dual cell 400 connected to both the emitter 328 of DIGBT 350A and the collector 327 of DIGBT 350B. In this configuration, the emitter 328 of DIGBT 350B is connected to voltage rail 404C. The collector 327 of DIGBT 350A is connected to the emitter 328 of DIGBT 350E at common voltage rail 404B, the collector 327 of DIGBT 350E is connected to the emitter 328 of DIGBT 350D which is also the output node 326 of MMC dual cell 400. The collector 327 of DIGBT 350D is connected to voltage rail 404A. The DC chopper 310B and the MMC cell capacitor 460B are each connected at the voltage rails 404B and 404C. Likewise, the DC chopper 310A and the MMC cell capacitor 460A are each connected at the voltage rails 404A and 404B. The two DC choppers 310A, 310B may be used to control the voltage across the three voltage rails 404 of MMC dual cell 400.

As discussed with reference to, for example, the power modules 252, 380 (FIGS. 2C, 3A), an interchangeable power module (e.g., power module 480) is an example of power module 252 and may also include certain circuitry from MMC dual cell 400 including the DIGBTs, the diodes 320 and their electrical inter-connections. The power module 480 may be relatively easily installed and removed from the wind turbine generator 100 without separate installation or removal of any individual components (e.g., IGBTs, DIGBTs, etc.). Further, power module 480 includes the DC choppers 310A, 310B including their dump resistors 330A and 330B which may be integrated into a heat sink for the power module 480. Power module 480's circuitry may be physically integrated into one physical body. The dump resistors 330A, 330B, are examples of the integrated chopper resistor 257.

In an embodiment, MMC cell capacitors 460A and 460B are electrically connected, but not physically integrated with the power module 480. In yet another embodiment, all of the circuitry in MMC dual cell 400 is integrated into the power module 480 including the MMC cell capacitors 460A, 460B. Note that dump resistors 330A, 330B should be of sufficient size and thermal mass as to absorb the energy produced in the MMC cell 400 including energy stored in the MMC cell capacitors 460A, 460B. The integrated dump resistors 330 may be physically partitioned within the power module to provide proportional heat dissipation according to the expected dissipation of each power device. In some embodiments, integrated dump resistors 330A and 330B comprise a plurality of series and/or parallel connected resistors such that the full-bridge configured main DIGBTs 350A, 350B, 350D, and 350E in the power module 480 include a separate heat sink with the connections electrically equivalent to single dump resistors 330A and 330B. Note that MMC cell capacitors 460A, 460B may be combined into one three-terminal capacitor.

In one embodiment, the MMC dual cell 400 is formed by interconnecting two power modules 380 (as shown in FIG. 3A), by connecting the power modules head-to-toe (i.e., electrically connecting the voltage rail 304A of one power module 380 to the voltage rail 304B of a second power module 380). Furthermore, physically stacking the power modules head-to-toe, provides a convenient opportunity to connect the modules thusly. As discussed above, in some embodiments, the dump resistors 330 are connected, but separate from the power modules 380.

Figure 4B:
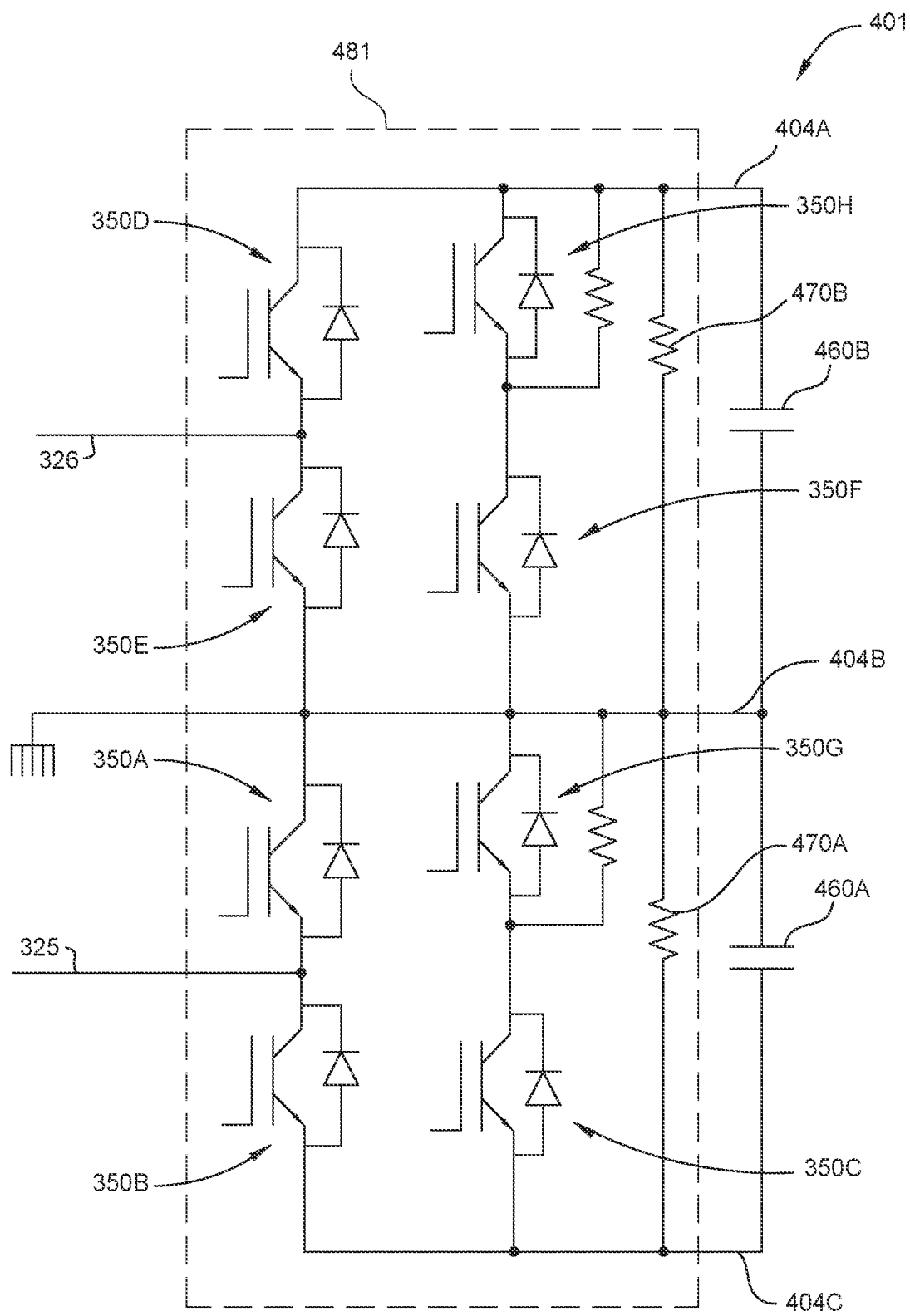
FIG. 4B illustrates a schematic of an MMC dual cell with integrated chopper and dump resistor with bleed resistors according to one or more embodiments described in this present disclosure.

FIG. 4B shows an MMC dual cell 401 is largely the same as MMC dual cell 400 except that, similar to the modifications shown in FIGS. 3B and 3C, the DIGBTs 350G, 350H in their respective DC choppers replace the diode 320. Also, the optional bleed resistors 470A, 470B are included in parallel with the MMC cell capacitors 460A, 460B. In one embodiment, the bleed resistors 470A, 470B are additionally or alternatively incorporated into a heat sink for power module 481. For one embodiment of the MMC dual cell 401, an associated power module 481 comprises all eight DIGBTs and the dump resistors 330A, 330B. This embodiment further modularizes the power module 481 in that the module may be symmetric with respect to the placement of the DIGBT's within the module 481. Additionally, the bill of materials is made simpler by only having one power type device in the module. Heat sink design may also be simplified or improved due to the possible physical symmetry of the module. Like in power module 480, dump resistors 330A, 330B may be physically partitioned within the power module to provide proportional heat dissipation according to the expected dissipation of each power device. In one embodiment, bleed resistors 470A, 470B are additionally or alternatively incorporated into a heat sink for power module 482.

Figure 5:
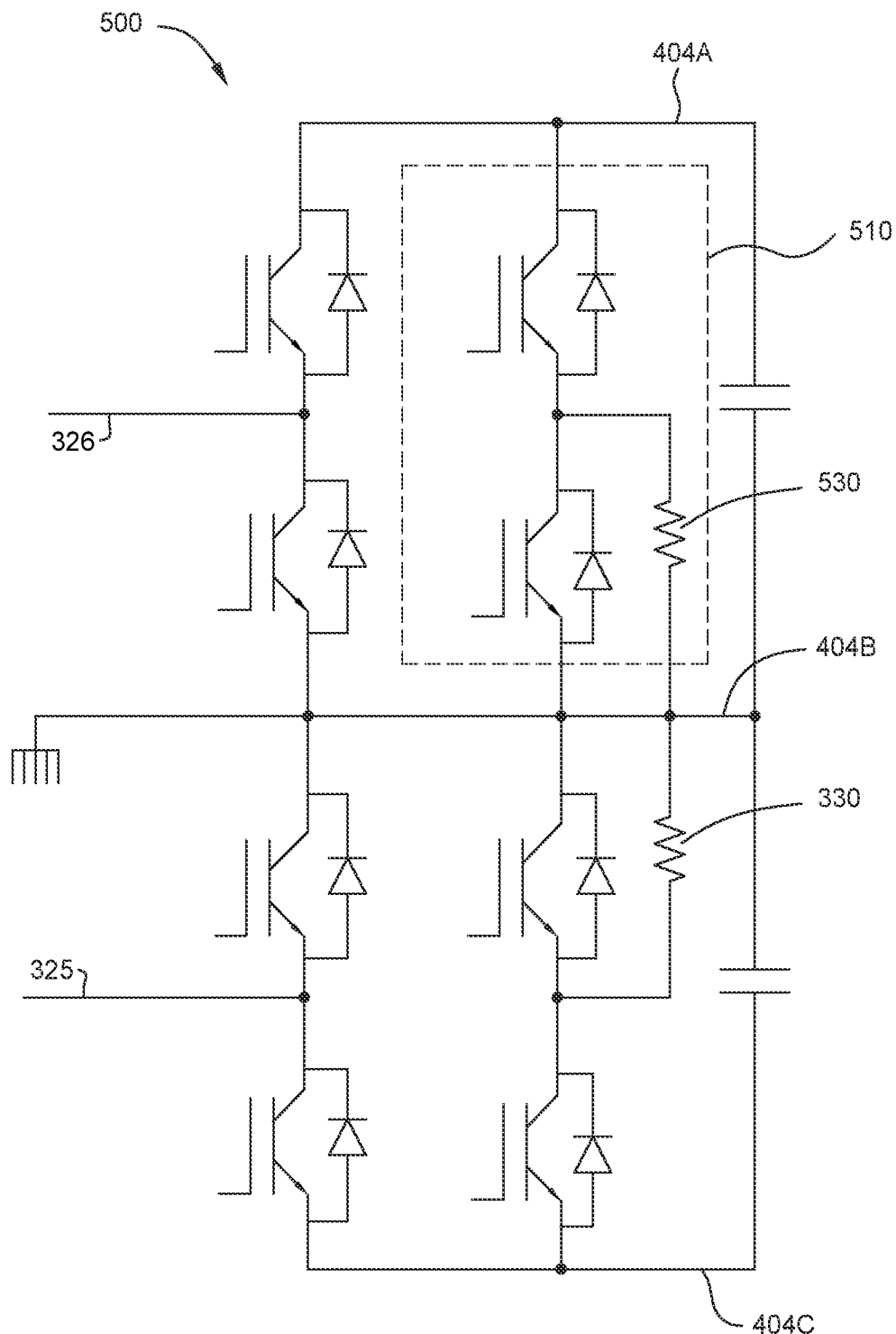
FIG. 5 illustrates a schematic of an MMC dual cell with integrated chopper and dump resistor according to one or more embodiments described in this present disclosure.

FIG. 5 illustrates another schematic of an MMC dual cell with integrated choppers and dump resistors according to another embodiment. The MMC dual cell 500 disclosed is largely the same as MMC dual cell 400 in FIG. 4A, however, one of the MMC dual cell's 500 integrated chopper resistors 257 is the dump resistor 530. In this example, the dump resistor 530 is tied to common voltage rail 404B compared to being tied off to voltage rail 404A in MMC dual cell 400. An advantage of this configuration is that a single dump resistor 530 that has three taps may replace the two discrete dump resistors 330 as shown in MMC dual cell 400. Further, regarding modularity, the MMC dual cell 500 may be formed by interconnecting an MMC single cell 300 with another MMC single cell 300 that is modified by disconnecting its dump resistor 330 from voltage rail 304A and connecting the free end to the common voltage rail 304B. As with, power module 481, the MMC dual cell 500 may also similarly benefit from substituting the diode in the integrated DC chopper 234 (i.e., DC chopper 510) or by the addition of a bleed resistors 370 across the voltage rails 404A, 404B, and 404B, 404C.

It should be noted that the power modules discussed above, according to some embodiments, may include storage capacitors (e.g., cell capacitors), bleed resistors, or other protective circuitry without departing from the nature of the invention. Additionally, power modules according to embodiments of this disclosure may include a manual jumper or jumper switch to configure the IGBT devices in the integrated DC choppers 234 to facilitate easy configuration of the modules.

Figure 6A:
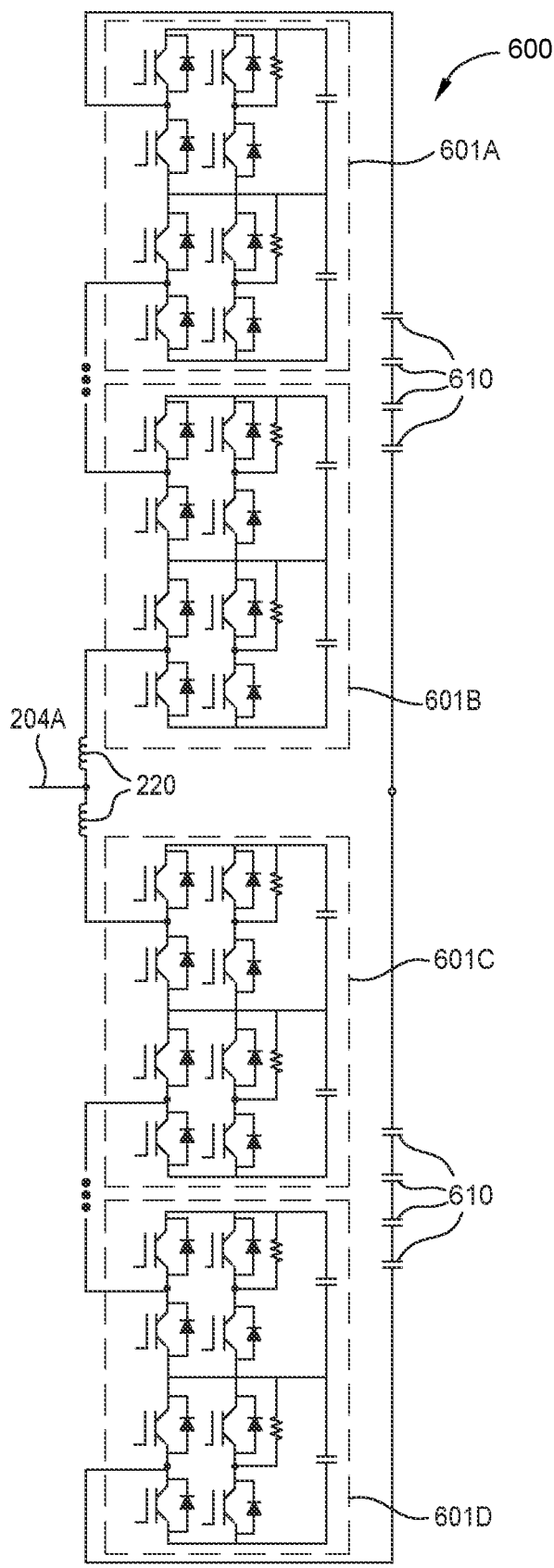
FIG. 6A illustrates a schematic of a single phase of an MMC according to one or more embodiments described in this present disclosure.
Figure 6B:
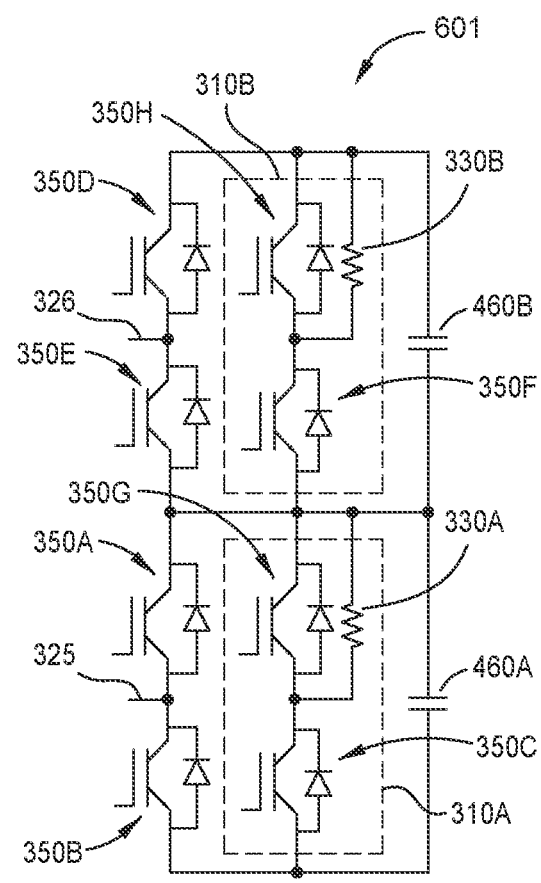
FIG. 6B illustrates a schematic of an MMC dual cell with integrated chopper and dump resistor according to one or more embodiments described in this present disclosure.

FIG. 6A shows a single phase arm in an embodiment of the current disclosure using four MMC dual cells 601A, 601B, 601C, and 601D. As detailed in FIG. 6B, each MMC cell 601 in FIG. 6A includes four main DIGBTs 350 (350D, 350E, 350A, and 350B) in full-bridge configuration, four more DIGBTs 350 used in two integrated DC choppers 310A (350G, 350C) and 310B (350H, 350F), two dump resistors 330A, 330B, and two MMC cell capacitors 460A, 460B. In this example, the IGBTs 352 within DIGBTs 350C, 350F are controllable switches 256 (e.g., controllable chopper transistors). The eight DC-link capacitors 610 represent capacitance on a DC-link of the converter.

By integrating the DC chopper into the MMC cell, the modularity of the MMC topology is maintained and furthermore, the converter can be protected against over-voltages at either converter level, arm level, or individual cell level. The proposed chopper solution also works well with cell balancing algorithms used to operate MMC type converters. The DC chopper can be also used to de-energize the converter by discharging the cells, thus eliminating the need for lossy cell bleed resistors 470.

Figure 6C:
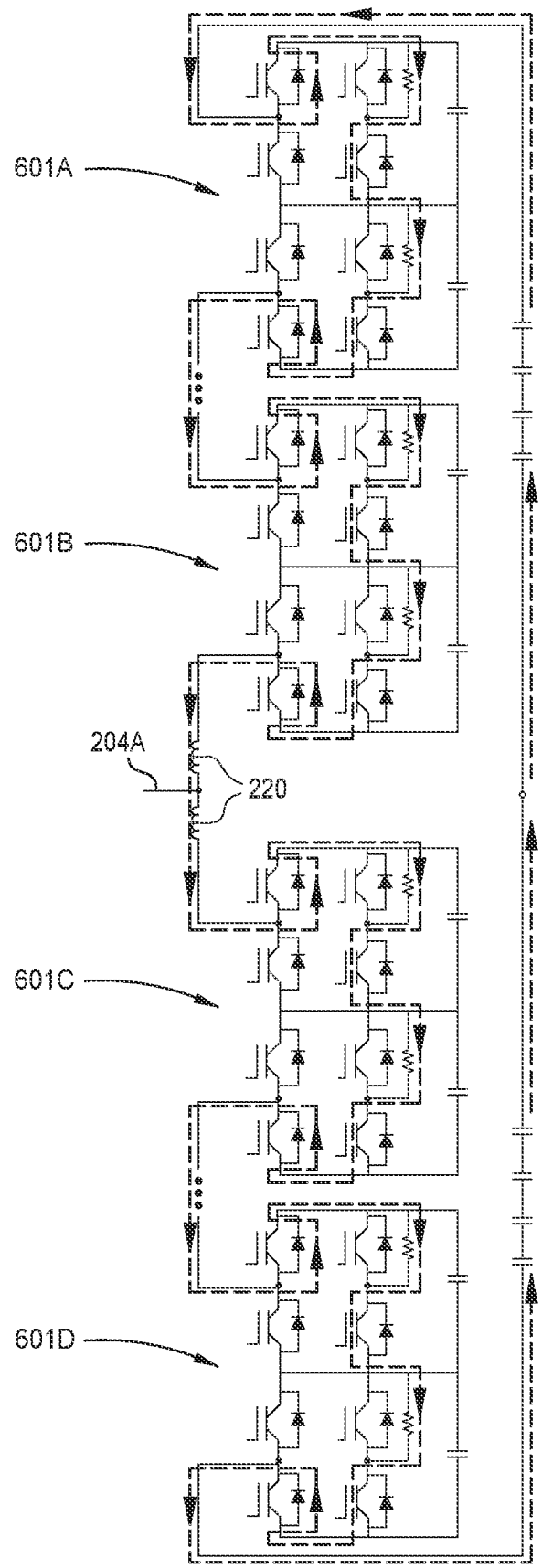
FIG. 6C illustrates a de-energization current path for the schematic of FIG. 6A.

FIG. 6C shows a current path (indicated by dashed line and arrows) for de-energization of the converter through phase leg 600 according to one embodiment. Corresponding steps for discharging the DC-link capacitors 610 and MMC cell capacitors 460 are described below in FIG. 7. For the de-energization, the operation of integrated DC choppers 310 in the MMC cells 601 of the converter provide for the discharging of DC-link capacitors 610, if any (e.g., at the common connection of LSC 290 and MSC 270) via current flowing through the cell dump resistors 330a, 330B as illustrated in FIG. 6C. Note, in some embodiments, the dump resistors 330 are integrated into heat sinks.

Figure 7:
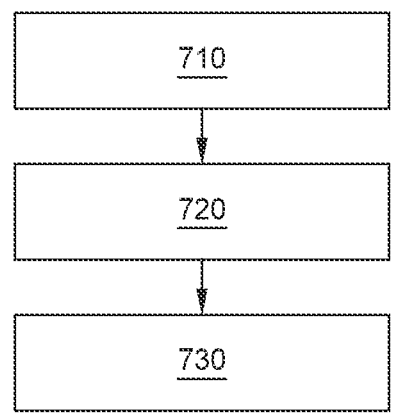
FIG. 7 illustrates a flowchart for de-energizing an MMC according to another embodiment described in this present disclosure.

FIG. 7 illustrates a flowchart for de-energizing an MMC according to another embodiment described in this present disclosure. At block 710, a controller (e.g., the controller circuits 274 in FIG. 2) recognizes an event that triggers de-energizing the converter. This may happen, for example, as a result of any number of situations such as detecting a fault current, a temperature limit fault, or as a result of a maintenance request. Once the controller has determined to de-energize the converter, at block 720, the controller instructs the DIGBT 350 devices, or more specifically, the controllable chopper transistor within each MMC cell to route current through the integrated dump resistors 330. Depending on topology, this may be done by routing current through the MMC cell 601. For example, a discharge current may be routed from the output node 326 of the MMC dual cell 601A to the input node 325 of the MMC dual cell 601A, and then on to the next MMC dual cell (i.e., MMC dual cell 601B) and so forth. For the example in FIG. 6C, the DIGBTs 350A, 350E, 350G, and 350H are de-asserted (i.e., turned off). This prevents a straight current path from the output node 326 of MMC dual cell 601A to the input node 325 of MMC dual cell 601A (i.e., a path that does not go through the integrated dump resistors 330). Likewise, the controller turns on the DIGBTs 350C and 350F to provide a path for current to discharge the DC-link capacitors 610 and the MMC cell capacitors 460A, 460B through the dump resistors 330A, 330B for each of the MMC cells 601 in the converter.

After the MMC cells are configured for de-energizing, at block 730, the controller determines a safe period of time to de-energize the cells based on, for example, RC time constants. Alternatively or additionally, for example, the discharge current is measured at a point along the discharge loop path (e.g., at the arm inductors 220). Steering the discharge current through the integrated chopper resistors 257 (i.e., dump resistors 330) according to the embodiments disclosed is preferred since the resistors can be made fairly large and to have significant thermal mass distributed throughout the MMC such that the energy dissipated by the integrated chopper resistors 257 is not concentrated over a small area or a single resistor.

Herein, reference is made to embodiments of the invention. However, it should be understood that the invention is not limited to specific described embodiments. Instead, any combination of the features and elements discussed above, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

The block diagrams in the Figures illustrate the architecture, functionality, and operation of possible implementations of systems, methods and computer program products according to various embodiments of the present invention. In this regard, block diagrams may represent a module, segment, or portion of code, which comprises one or more executable instructions for implementing the specified logical function(s). It will also be noted that each block of the block diagrams, and combinations of blocks in the block diagrams, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

The invention claimed is:

1. A modular multilevel converter (MMC), comprising:
a plurality of MMC cells, a first MMC cell of the plurality of MMC cells comprising:
a first main transistor and a second main transistor connected in series between a first voltage rail and a second voltage rail;
a first direct current (DC) chopper directly connected to the first voltage rail and to the second voltage rail and comprising a first dump resistor directly connected to the second voltage rail and to a first node between a first controllable chopper transistor and a second controllable chopper transistor of the first DC chopper, wherein the first DC chopper further comprises a diode connected in parallel with the first dump resistor and the second controllable chopper transistor of the first DC chopper; and
a first cell capacitor directly connected to the first voltage rail and to the second voltage rail in parallel to the first DC chopper; and
a second MMC cell of the plurality of MMC cells comprising:
a third main transistor and a fourth main transistor connected in series between a third voltage rail and the second voltage rail;
a second DC chopper directly connected to the third voltage rail and to the second voltage rail and comprising a second dump resistor directly connected to the second voltage rail and to a second node between a third controllable chopper transistor and a fourth controllable chopper transistor of the second DC chopper, wherein the second DC chopper further comprises a diode connected in parallel with the second dump resistor and the third controllable chopper transistor of the second DC chopper; and
a second cell capacitor directly connected to the first third voltage rail and to the second voltage rail in parallel to the second DC chopper, wherein the first dump resistor and the second dump resistor are directly connected together in series at the second voltage rail.

2. The MMC according to claim 1, wherein at least two the first main transistor and the second main transistor are connected in parallel with the first DC chopper.

3. The MMC according to claim 1, further comprising a bleed resistor connected between the first voltage rail and the second voltage rail and in parallel with the first DC chopper.

4. A method for de-energizing a modular multilevel converter (MMC), the method comprising:
receiving an instruction to de-energize a phase leg of the MMC, the MMC comprising a plurality of MMC cells;
configuring power transistors in the plurality of MMC cells of the phase leg to guide current through a plurality of direct current (DC) choppers integrated into the plurality of MMC cells; and
determining a period of time to de-energize the MMC using resistors in the plurality of DC choppers, the MMC comprising:
a first MMC cell of the plurality of MMC cells comprising:
a first main transistor and a second main transistor connected in series between a first voltage rail and a second voltage rail;
a first DC chopper of the plurality of DC choppers directly connected to the first voltage rail and to the second voltage rail and comprising a first dump resistor directly connected to the second voltage rail and to a first node between a first controllable chopper transistor and a second controllable chopper transistor of the first DC chopper, wherein the first DC chopper further comprises a diode connected in parallel with the first dump resistor and the second controllable chopper transistor of the first DC chopper; and
a first cell capacitor directly connected to the first voltage rail and to the second voltage rail in parallel to the first DC chopper; and
a second MMC cell of the plurality of MMC cells comprising:
a third main transistor and a fourth main transistor connected in series between a third voltage rail and the second voltage rail;
a second DC chopper of the plurality of DC choppers directly connected to the third voltage rail and to the second voltage rail and comprising a second dump resistor directly connected to the second voltage rail and to a second node between a third controllable chopper transistor and a fourth controllable chopper transistor of the second DC chopper, wherein the second DC chopper further comprises a diode connected in parallel with the second dump resistor and the third controllable chopper resistor of the second DC chopper; and
a second cell capacitor directly connected to the third voltage rail and to the second voltage rail in parallel to the second DC chopper, wherein the first dump resistor and the second dump resistor are directly connected together in series at the second voltage rail.

5. A modular multilevel converter (MMC) power module, comprising:
a first set of at least two main transistors connected in series between a first voltage rail and a second voltage rail;
a second set of at least two main transistors connected in series between a third voltage rail and the second voltage rail;
a first direct current (DC) chopper directly connected to the first voltage rail and to the second voltage rail, the first DC chopper comprising a first controllable chopper transistor directly connected to the first voltage rail, a second controllable chopper transistor directly connected to the second voltage rail, and a first dump resistor directly connected to the second voltage rail and to a first node between the first controllable chopper transistor and the second controllable chopper transistor of the first DC chopper, wherein the first DC chopper further comprises a diode connected in parallel with the first dump resistor and the second controllable chopper transistor of the first DC chopper;
a first cell capacitor directly connected to the first voltage rail and to the second voltage rail in parallel to the first DC chopper;
a second DC chopper directly connected to the third voltage rail and to the second voltage rail, the second DC chopper comprising a third controllable chopper transistor directly connected to the second voltage rail, a fourth controllable chopper transistor directly connected to the third voltage rail, and a second dump resistor directly connected to the second voltage rail and to a second node between the third controllable chopper transistor and the fourth controllable chopper transistor of the second DC chopper, wherein the second DC chopper further comprises a diode connected in parallel with the second dump resistor and the third controllable chopper transistor of the second DC chopper; and
a second cell capacitor directly connected to the second voltage rail and to the third voltage rail in parallel to the second DC chopper, wherein the first dump resistor and the second dump resistor are directly connected together in series at the second voltage rail.

6. The MMC power module according to claim 5, wherein the first set of at least two main transistors is connected in parallel with the first DC chopper.

7. The MMC power module according to claim 5, further comprising a bleed resistor connected between the first voltage rail and the second voltage rail and in parallel with the first DC chopper.

* * * * *